(12) United States Patent
Wilhelm et al.

(10) Patent No.: US 11,940,409 B2
(45) Date of Patent: Mar. 26, 2024

(54) DIGITAL pH SENSOR AND MEASURING METHOD OF A DIGITAL pH SENSOR

(71) Applicant: Endress+Hauser Conducta GmbH+Co. KG, Gerlingen (DE)

(72) Inventors: Thomas Wilhelm, Chemnitz (DE); Michael Hanko, Dresden (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 40 days.

(21) Appl. No.: 17/076,157

(22) Filed: Oct. 21, 2020

(65) Prior Publication Data

US 2021/0123885 A1   Apr. 29, 2021

(30) Foreign Application Priority Data

Oct. 23, 2019   (DE) .................... 10 2019 128 621.2

(51) Int. Cl.
*G01N 27/416*  (2006.01)
*G01K 13/00*   (2021.01)

(52) U.S. Cl.
CPC ......... *G01N 27/4167* (2013.01); *G01K 13/00* (2013.01); *G01N 27/4161* (2013.01)

(58) Field of Classification Search
CPC .. G01N 27/327; G01N 27/4161; G01N 27/48; G01N 27/305; G01N 27/28;
(Continued)

(56) References Cited

U.S. PATENT DOCUMENTS

2010/0224490 A1* 9/2010 King ................... G01N 27/403
                                                  204/412
2015/0053576 A1* 2/2015 Pechstein ............ G01N 27/302
                                                  205/787.5

(Continued)

FOREIGN PATENT DOCUMENTS

CN         2053340 U   *  2/1990
CN       104380093 A      2/2015
(Continued)

OTHER PUBLICATIONS

Matsuda et al., English translation of JP-2001242134-A, 2001 (Year: 2001).*

(Continued)

*Primary Examiner* — Luan V Van
*Assistant Examiner* — Shizhi Qian
(74) *Attorney, Agent, or Firm* — Mark A. Logan; Endress+Hauser (USA) Holding, Inc.

(57) ABSTRACT

Disclosed is a digital pH sensor for measuring the pH, comprising an electronics unit, sensor housing having a first half-cell and a second half-cell adapted to form a potential difference between the first electrode and the second electrode if the digital pH sensor is in contact with a measurement medium, wherein the electronics unit is adapted for converting the potential difference into a digital voltage value or a digital pH value, wherein the first electrolyte, the first electrode, the second electrolyte, and/or the second electrode are selected such that, at a pH value of 7 and a temperature of 25° C. in the measurement medium, the potential difference of the two electrodes is not equal to 0 mV, and wherein the electronics unit converts the potential difference into the digital measured pH value of 7 or a digital measured voltage value of 0 mV.

11 Claims, 5 Drawing Sheets

(58) Field of Classification Search
CPC ..... B01L 2200/0684; B01L 2300/0645; B01L 2300/0877; B01L 2300/163; B01L 3/502715; C12M 23/22; C12M 41/36
See application file for complete search history.

(56) References Cited

U.S. PATENT DOCUMENTS

2018/0106748 A1* 4/2018 Grimm ................ G01N 27/301
2019/0187091 A1   6/2019 Speck et al.

FOREIGN PATENT DOCUMENTS

| DE | 102010040057 A1 |   | 3/2012 |           |
|----|-----------------|---|--------|-----------|
| DE | 102014113260 A1 | * | 3/2016 | ........... G01N 27/301 |
| DE | 102018108301 A1 |   | 10/2018 |          |
| DE | 102018128885 A1 |   | 6/2019 |           |
| JP | 2001242134 A    | * | 9/2001 |           |
| WO | WO-2010072601 A1 | * | 7/2010 | ............. G01N 27/36 |
| WO | 2013112767 A1   |   | 8/2013 |           |
| WO | WO-2019073396 A1 | * | 4/2019 | ........... G01N 27/301 |

OTHER PUBLICATIONS

Hanko et al., English translation of WO-2010072601-A1, 2010 (Year: 2016).*
Jiang, English translation of CN2053340U, 1990 (Year: 1990).*

* cited by examiner

DIGITAL pH SENSOR AND MEASURING METHOD OF A DIGITAL pH SENSOR

CROSS-REFERENCE TO RELATED APPLICATION

The present application is related to and claims the priority benefit of German Patent Application No. 10 2019 128 621.2, filed on Oct. 23, 2019, the entire contents of which are incorporated herein by reference.

TECHNICAL FIELD

The present disclosure relates to a digital pH sensor and a measuring method of a digital pH sensor, to a digital sensor system and to an evaluation method of a measuring transducer.

BACKGROUND

In environmental technology and in almost all industrial processes dealing with water, pH is a key measurement and influencing variable, since it influences the thermodynamics and kinetics of virtually all chemical reactions involving water. This relates to, for example, targeted reactions involving water, separation processes in aqueous systems, corrosion on and in reactors and conduit systems, the solubility of environmentally active substances, and living conditions for organisms. The determination, in particular the sensor measurement of the pH value in real time is therefore an important task of environmental and process measurement technology. The pH glass electrode is established as the most important sensor of the pH of a measurement medium; it can measure the pH with low cross-sensitivities over a large measurement range, is chemically stable and durable and delivers an electrical measurement signal from the outset.

Even though pH glass electrodes or the pH single-rod measuring cells contained in them differ in many technically relevant details, the basic structure is always the same (see FIG. 6): fundamentally, a pH single-rod measuring cell, also referred to as a pH sensor or, in many cases, as a pH electrode, consists of two electrochemical half-cells, both of which are in contact with the measurement medium in different ways and between whose electrodes an electrical voltage across the measurement medium is measured. The first half-cell, the so-called "measuring half-cell," is in contact with the measurement medium via a thin glass layer, the so-called "pH glass membrane." The second half-cell, the so-called "reference half-cell," is in contact with the measurement medium via an electrochemical junction, which allows for limited ion exchange, and thus ion conduction, between the reference electrolyte and the measurement medium, but largely prevents substantial mass exchange, mainly by convection. The potential drop across the junction, the so-called "diaphragm," is thus 0 mV, while the potential drop across the glass membrane depends in a known manner on the composition of the electrolyte of the measuring half-cell (the so-called "internal electrolyte").

The composition of the glass membrane in particular determines the sensitivity, linearity, measuring range and chemical and temperature stability of a sensor and is thus an essential quality characteristic. Such glass compositions, which contain a great deal of technical knowledge, are generally trade secrets of the sensor manufacturers.

Special embodiments of pH sensors use additional electrolyte chambers as bridge electrolytes, multiple junctions or even solid-state reference electrodes in direct contact with the measurement medium. Depending on the configuration, the pH voltage is not measured directly between the two electrodes, but between the electrodes and an additional discharge electrode. In many cases, the sensors also contain further measuring elements such as redox electrodes or thermosensors.

Some features of these sensors have become established as the standard: as a rule, electrodes of the second type, in particular Ag/AgCl electrodes, are used as reference and internal electrodes. The chloride ion activity, adjusted using potassium chloride, is 3 mol/l in both electrolytes or the reference electrolyte is saturated with KCl. Optionally, known internal electrolytes can comprise up to 50% glycol or glycerol. The internal electrolyte has a pH of 7. The zero point is at a pH of 7 in standard pH sensors. The pH glass membrane has a slope below −59.16 mV per pH difference between the measurement medium and the internal electrolyte, typically between 57 and 59 mV/pH. The result of this is that at a pH value of the measurement medium of 7 and at a measuring temperature of 25° C., the sensor outputs a measured voltage of 0 mV or the pH 7.

A significant problem with pH measurement using glass electrodes is the low conductivity of the glass membrane over which it is necessary to measure, and thus the high impedance of the overall sensor in the range of 50 MOhm to 1 GOhm. This is countered with notably complex and dense plugs, with pluggable impedance transducers, short measuring cables, moisture-proof measuring fittings and, not least, a coaxial sensor design, in which the low-impedance reference half-cell is arranged around the high-impedance measuring half-cell and shields it from electromagnetic interference.

In high-quality sensors, systems have been established in recent years, with which measurement amplifiers and electronics for A/D conversion are integrated into the sensor plug head and only digital signals are transmitted from the sensor to the superordinate unit. Particularly noteworthy here is Memosens, which has an inductive interface, is enclosed and wholly impermeable to liquids and, in addition, stores important operating parameters of the sensor in the internal memory and already possesses simple measured value calculations and diagnostic functions.

In principle, it is possible to separate digital sensor plug heads from high-quality sensors and connect them to analog sensors, so that the digital pH sensor is fed measured values determined by an analog pH sensor. This can be done both in the form of a "digitized" sensor and in the form of a plug adapter. However, serious potential disadvantages arise for the user:

Sensors modified by inexpensive components often have poorer measurement performance, in particular in regard to the properties achieved by using a high-quality membrane glass.

Integrating a suitable and correctly placed temperature sensor is difficult, meaning that the sensor temperature is either not measured at all or at the wrong point.

The special safety features such as resistance to environmental stresses are lost in this case.

The programming of the sensor electronics is no longer suitable for the specifications of the half-cells used, which can lead to errors in calculation and diagnostic functions.

Estimates of measurement uncertainties made in the sensor or at a level superordinate to the sensor no longer match.

If a user or a third party modifies a digital pH sensor in the manner described, the safety advantages gained by a digital pH sensor are no longer guaranteed. Thus, for example, users can experience unwanted harm due to incorrect measured values.

SUMMARY

It is therefore an object of the present disclosure to provide a digital pH sensor which allows safe measuring operation.

This object is achieved according to the present disclosure by a digital pH sensor according to claim 1.

The digital pH sensor according to the present disclosure comprises an electronics unit, a sensor housing having a first half-cell and a second half-cell. The first half-cell has a first electrolyte and a first electrode in contact with the first electrolyte, and the first electrode is electrically connected to the electronics unit. The second half-cell has a second electrolyte and a second electrode in contact with the second electrolyte, and the second electrode is electrically connected to the electronics unit. The first half-cell and the second half-cell are adapted to form a potential difference between the first electrode and the second electrode if the digital pH sensor is in contact with a measurement medium. The electronics unit is adapted to convert the potential difference into a digital measured value. The digital measured value is either a voltage value or a pH value. The first electrolyte and/or the material of the first electrode and/or the second electrolyte and/or the material of the second electrode are selected such that, at a pH of the measurement medium of 7 and a temperature of the measurement medium of 25° C., the potential difference between the two electrodes is set so that the potential difference is not equal to 0 mV, preferably greater than 30 mV or less than −30 mV, preferably greater than 50 mV or less than −50 mV, preferably greater than 100 mV or less than −100 mV, and the electronics unit converts the potential difference into the digital measured value such that, at a pH value of the measurement medium of 7 and at a temperature of the measurement medium of 25° C. and a potential difference not equal to 0 mV, preferably greater than 30 mV or less than −30 mV, preferably greater than 50 mV or less than −50 mV, preferably greater than 100 mV or less than −100 mV, the digital measured value is 0 mV if the digital measured value is output as a voltage value or is equal to 7 if the digital measured value is output as a pH value.

The digital pH sensor according to the present disclosure makes it possible to check for the presence of the safety conditions necessary for operation of a digital pH sensor. The user is thus enabled to be warned and/or protected from safety risks.

In one embodiment of the present disclosure, the second electrolyte has a pH at 25° C. which differs by more than 0.5, preferably more than 0.85, preferably more than 1.7 from 7.

In one embodiment of the present disclosure, the second electrolyte has a pH of 6 at 25° C. The first electrolyte comprises, for example, potassium chloride and the second electrolyte comprises, for example, potassium chloride and a phosphate buffer.

In one embodiment of the present disclosure, the first electrode and the second electrode are Ag/AgCl electrodes and the chlorine ion activity of the first electrolyte and the second electrolyte are different such that the potential difference is greater than 30 mV, preferably greater than 50 mV, preferably greater than 100 mV.

In one embodiment of the present disclosure, the material of the first electrode and the second electrode comprises silver or copper or platinum or conductive carbon. The first electrolyte and the second electrolyte contain halide or sulfate ions, so that the potential difference is greater than 30 mV, preferably greater than 50 mV, preferably greater than 100 mV.

The object according to the present disclosure is also achieved by a method according to claim 7.

The method according to the present disclosure comprises the following steps:
Providing a digital pH sensor according to the present disclosure,
Measuring a potential difference between the first electrode and the second electrode using the electronics unit in a measurement medium, wherein the potential difference at a pH value of the measurement medium of 7 and at a temperature of the measurement medium of 25° C. is not equal to 0 mV, preferably greater than 30 mV or less than −30 mV, preferably greater than 50 mV or less than −50 mV, preferably greater than 100 mV or less than −100 mV, and
Converting the potential difference measured at a pH value of the measurement medium of 7 and at a temperature of the measurement medium of 25° C. into a digital measured value using the electronics unit in such a way that the digital measured value is 0 mV if the digital measured value is output as a voltage value or 7 if the digital measured value is output as a pH value.

It should be noted that the stated values, for example the voltage value of 0 mV or the pH value of 7, are ideal values which are rarely exactly reached in a real measurement. The conversion of the potential difference which is not equal to 0 mV at a temperature of 25° C. and a pH value of 7 of the measurement medium is to be understood as a type of compensation for the desired specific structural and chemical characteristics of the sensor, in particular of the electrolytes and electrode materials used, which are different from sensors of standard design. Additional compensations applied to the output values, which are necessary, for example, due to aging or wear of the sensor, can additionally be taken into account in the conversion.

In one embodiment of the present disclosure, the electronics unit uses a correction function in the step of converting the potential difference into the digital measured value.

In one embodiment of the present disclosure, the correction function comprises an adjustable correction factor.

In one embodiment of the present disclosure, the correction function comprises a temperature factor. The temperature factor is determined based on a temperature value of the measurement medium. The temperature value of the electronics unit is transmitted by a temperature sensor integrated into the digital pH sensor or by the measuring transducer.

In one embodiment of the present disclosure, the correction function comprises an operating time factor. The operating time factor is determined based on an operating time of the digital pH sensor. The electronics unit 2 is adapted to detect the operating time of the pH sensor.

The object according to the present disclosure is further achieved by a digital sensor system according to claim 11.

The digital sensor system according to the present disclosure comprises:
A digital pH sensor according to the present disclosure,
A measuring transducer for receiving and evaluating a digital measured value, wherein the measuring transducer is adapted to be connected to the digital pH sensor.

The object according to the present disclosure is further achieved by an evaluation method of a measuring transducer according to claim 12.

The evaluation method according to the present disclosure comprises at least the following steps:
- Providing a digital sensor system according to the present disclosure,
- Receiving a digital measured value from the digital pH sensor,
- Comparing the digital measured value with an upper limit value and a lower limit value,
- Outputting an error message if the digital measured value exceeds the upper limit value or falls below the lower limit value.

BRIEF DESCRIPTION OF THE DRAWINGS

The present disclosure will be explained in more detail on the basis of the following description of the figure. The following are shown.

DETAILED DESCRIPTION

Figure 1:
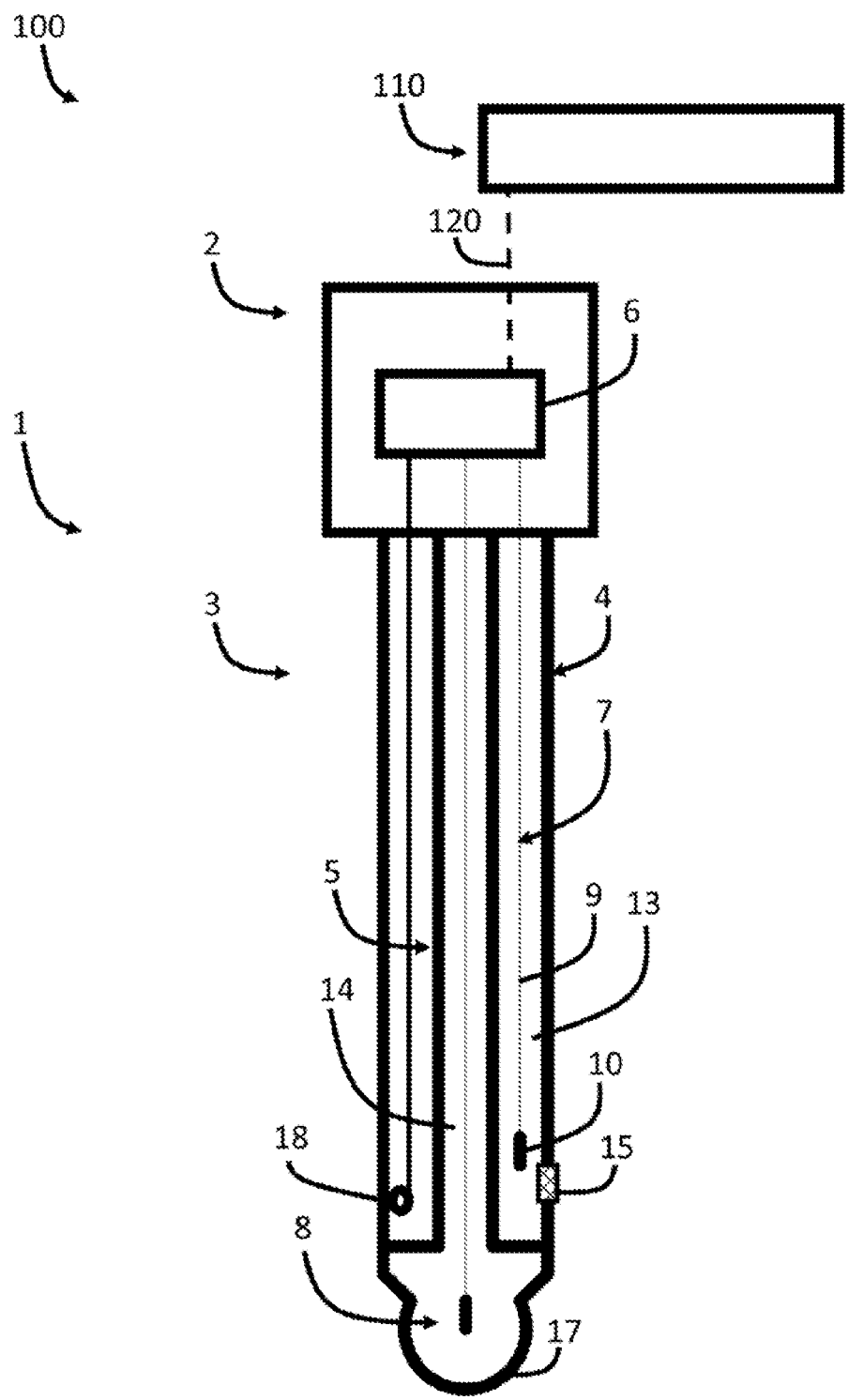
FIG. 1 shows a schematic representation of a digital sensor system with a digital pH sensor according to the present disclosure.

FIG. 1 shows an exemplary embodiment of a digital sensor system 100 according to the present disclosure with measuring transducer 110 and digital pH sensor 1.

The measuring transducer 110 is adapted to communicate with the digital pH sensor 1 via a transmission means 120. The transmission means 120 comprises, for example, a wireless communication interface. Alternatively or additionally, the transmission means 120 comprises, for example, a cable for transmitting energy and/or data between the measuring transducer 110 and the digital pH sensor 1. The cable is connected to the digital pH sensor 1, for example via a galvanically isolated interface.

The digital pH sensor 1 is adapted for measuring the pH in a measurement medium and for providing it or communicating it to the measuring transducer 110 via the transmission means 120 as a digital measured value, in the unit pH and/or in the unit mV and/or as an arbitrarily computed/corrected value in any other unit.

Hereinafter, the term digital measured value is understood to mean a value, for example, a voltage value, which exists in digital form, i.e. as an encoded signal. This means that a specific bit sequence represents a number, the value.

Hereinafter, the term potential difference is understood to mean a value, for example, a voltage value, which exists in analog form, i.e. as a continuous signal.

The digital pH sensor 1 comprises an electronics unit 2 and a sensor housing 3. The electronics unit 2 has a computing module 6 for generating digital measured values DM and sending them to the measuring transducer 110. The computing module 6 can include, for example, a microcontroller and a wireless communication module. The wireless communication module is adapted to send and receive data, for example, by Wi-Fi, Bluetooth or other methods of communication.

The sensor housing 3 comprises a first half-cell 4 and a second half-cell 5. The first half-cell 4 is, for example, a reference half-cell and the second half-cell 5 is, for example, a measuring half-cell. The first half-cell 4 has an electrolytic junction 15. The second half-cell 5 has a membrane 17 or an active sensing surface.

The first half-cell 4 has a first electrolyte 13. The first half-cell 4 further comprises a first electrode 7 which is in contact with the first electrolyte 13 and is electrically connected to the electronics unit 2. The second half-cell 5 has a second electrolyte 14. The second half-cell 5 further comprises a second electrode 8 which is in contact with the second electrolyte 14 and is electrically connected to the electronics unit 2.

The first half-cell 4 and the second half-cell 5 are designed such that a potential difference between the first electrode 7 and the second electrode 8 is formed if the digital pH sensor 1 is surrounded by a measurement medium, i.e. is in contact with the measurement medium. The electronics unit 2 is adapted for converting the potential difference into a digital measured value DM. This conversion is carried out by the computing unit 6.

The first electrolyte 13 and/or the material of the first electrode 7 and/or the second electrolyte 14 and/or the material of the second electrode 8 are selected such that, at a pH value of the measurement medium of pH 7 and a temperature of the measurement medium of 25° C., the potential difference of the two electrodes is set such that the potential difference is not equal to 0 mV. In a preferred embodiment, the potential difference with identical measurement medium properties is greater than 30 mV or less than −30 mV. In an alternative embodiment, the potential difference with identical measurement medium properties is greater than 50 mV or less than −50 mV. In an alternative embodiment, the potential difference with identical measurement medium properties is preferably greater than 100 mV or less than −100 mV. The electronics unit 2 is adapted for converting the potential difference into the digital measured value DM in such a way that, at a temperature of the measurement medium of 25° C. and a pH value of the measurement medium of 7 and a potential difference not equal to 0 mV or, depending on the exemplary embodiment, greater than 30 mV or less than −30 mV, or greater than 50 mV or less than −50 mV, or greater than 100 mV or less than −100 mV, the digital measured value DM is 0 mV (see also Table 1).

In other words, the electronics unit 2 or the computing unit 6 is configured to convert the potential difference into the digital measured value DM in such a way that the value of the potential difference is different from the value of the digital measured value DM. For example, the potential difference is 50 mV and the converted corresponding digital measured value DM is 0 mV or the pH value is 7.

In other words, the first electrolyte 13 and/or the material of the first electrode 7 and/or the second electrolyte 14 and/or the material of the second electrode 8 are selected such that a different potential difference is set than in conventional pH sensors. This means that, in a pH sensor according to the present disclosure with potassium chloride as electrolyte and a silver-silver chloride electrode, a potential difference not equal to 0 V is set in a measurement medium with pH 7 at 25° C. At other pH values of the measurement medium, the potential difference in conventional pH sensors changes according to a linear function, hereinafter called a standard function, which has a slope of −59 mV/pH and passes through the point 0 V, as described in the introduction. If the temperature of the measurement medium changes, other suitable standard functions are known.

In an embodiment that is compatible with the previously described embodiment, the first electrolyte 13 and/or the material of the first electrode 7 and/or the second electrolyte 14 and/or the material of the second electrode 8 are selected such that, for a preset pH value of the measurement medium and a preset temperature of the measurement medium, the potential difference differs from the known standard functions by a predetermined factor. The electronics unit 2 or the computing unit 6 is configured to convert the potential difference into the corresponding digital measured value DM in such a way that the digital measured value DM corresponds to a digital measured value of the known standard functions. The known standard functions are stored in the electronics unit 2 or in the computing unit 6.

Since the potential difference in the pH sensor 1 according to the present disclosure is preset to be different from the potential difference to be expected in a conventional pH sensor, if the pH sensor 1 is modified so that it is fed a potential difference of a conventional pH sensor, the digital measured value DM generated by the electronics unit 2 will deviate greatly from the expected digital measured value, allowing the presence of a safety issue to be easily detected.

In one embodiment, the second electrolyte 14 is selected such that its pH at 25° C. is pH 7.

In such embodiment, the first electrolyte 13 comprises, for example, potassium chloride with an activity of 3 mol/l and the second electrolyte 14, for example potassium chloride with an activity of 1 mol/l or 0.3 mol/l.

In one embodiment, the second electrolyte 14 is selected such that its pH at 25° C. is <6.5; in particular <6.15; in particular <5.3 (see also Table 1).

In an alternative embodiment, the second electrolyte 14 is selected such that its pH at 25° C. is >7.5; in particular >7.85; in particular >8.7 (see also Table 1).

In one exemplary embodiment, the second electrolyte 14 has a pH value of pH 6 at 25° C. In such exemplary embodiment, the first electrolyte 13 comprises, for example, potassium chloride and the second electrolyte 14 comprises, for example, potassium chloride and a phosphate buffer pH 6.

If the deviation of the potential difference from the potential difference determined from the standard functions is achieved as a result of the properties of an electrolyte, the first electrolyte 13 and the second electrolyte 14 must be selected such that there is a difference in the electrode potential between the reference electrode and the measuring electrode. For example: if the chloride ion activity in the reference electrolyte is 3 mol/l, the potential difference depending on the Cl activity of the internal electrolyte is 30 mV at 0.93 mol/l, 50 mV at 0.43 mol/l and 100 mV at 0.06 mol/l (see also Table 1).

The potential-forming systems can be, for example, silver/silver chloride, silver/silver sulfate, copper/copper sulfate, or iodine/iodide. The reference and measuring electrodes can be based on the same or different potential-forming systems. The temperature correction functions for the electrode potentials must be adapted appropriately if the reference and measuring electrode systems are different and have different temperature ranges.

Figure 2:
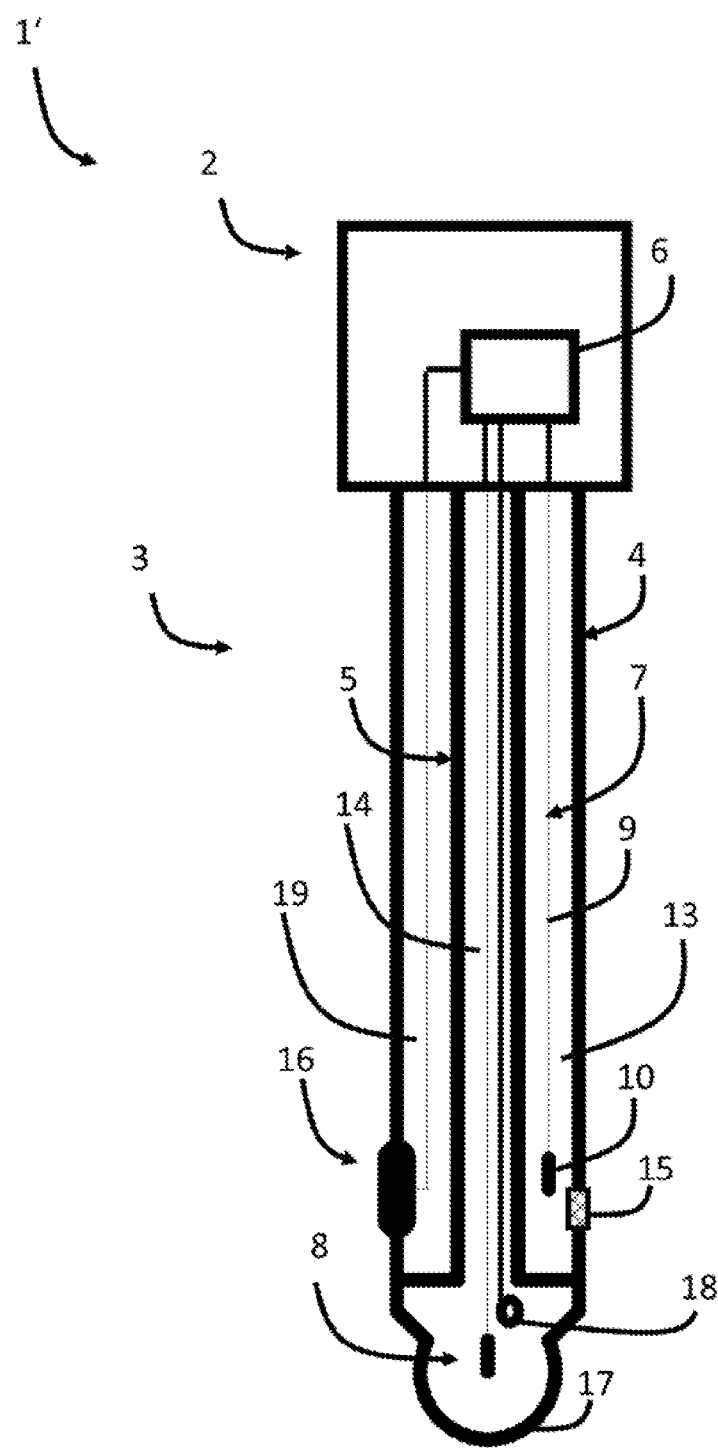
FIG. 2 shows a schematic representation of an alternative embodiment of the sensor represented in FIG. 1.

FIG. 2 shows an alternative embodiment of the digital pH sensor 1'. In such embodiment, the pH sensor 1' additionally has a third electrode 16 for measuring the redox potential of the measurement medium. For redox measurement, a potential difference is measured between the third electrode 16, also called the redox electrode, and the first electrode 7, which is the reference electrode in FIG. 2. The material of the redox electrode should be a chemically stable, electrically conductive material which is as inert as possible. Examples are platinum, gold or conductive carbon (glassy carbon, graphite, doped diamond).

In such embodiment, the pH sensor 1' also has a temperature sensor 18 in order to detect the temperature in the measurement medium. The functioning of the digital pH sensor 1' in such embodiment is otherwise identical to that of the pH sensor 1 shown in FIG. 1.

If the digital pH sensor used in the digital sensor system 100 does not have a temperature sensor 18, a temperature sensor independent of the pH sensor can also be connected to the measuring transducer 110.

In one embodiment, the pH sensor according to the present disclosure comprises a second electrolyte 14 which has a pH value different from 7, so that at a temperature of the measurement medium of 25° C. and a pH value of the measurement medium of 7, a preset potential difference forms between the first electrode 7 and the second electrode (see first and second column of Table 1).

In one embodiment, the pH sensor 1 according to the present disclosure comprises Ag/AgCl electrodes and comprises a second electrolyte 14 having a preset chloride activity different from 3 mol/l, so that at a temperature of the measurement medium of 25° C. and a pH value of the measurement medium of 7, a preset potential difference forms between the first electrode 7 and the second electrode 8 (see first and third and fourth column of Table 1).

In an embodiment compatible with the above-described embodiments, the potential difference between the first electrode 7 and the second electrode 8 is achieved by a combination of a preset pH difference between the second electrolyte 14 and the pH 7 combined with a preset chloride ion activity ratio of the second electrolyte 14. For example, the internal electrolyte has a pH difference of 0.51, resulting in a potential difference of 30 mV, with the internal electrolyte additionally having a chloride ion activity ratio of 3.22 mol/l, resulting in an additional potential difference of 30 mV, and thus a total potential difference of 60 mV between the first electrode 7 and the second electrode 8 is achieved (see Table 1).

TABLE 1

| Potential difference (mV) | pH difference | Quotient for chloride activity (mol/l) | C(cRef = 3) |
|---|---|---|---|
| 30 | 0.51 | 3.22 | 0.93 |
| 50 | 0.85 | 7.04 | 0.43 |
| 60 | 1.02 | 10.40 | 0.29 |
| 100 | 1.69 | 49.54 | 0.06 |
| 120 | 2.03 | 108.12 | 0.03 |

The measuring method of the digital pH sensor 1 will be described below.

In a first implicit step, the digital pH sensor 1, 1' is provided. This means the pH sensor 1, 1' is ready for operation and immersed in a measurement medium.

A potential difference is then measured by the electronics unit 2. That is, the electronics unit 2 evaluates the potential difference between the first electrode 7 and the second electrode 8.

Optionally, the electronics can correct the potential difference even before analog-digital conversion, for example by generating a corrective voltage offset. If such an analog electronic measured value correction is performed, it will fully compensate for the voltage difference from a standard sensor (0 mV at pH 7, 25° C.), as a result of which the analog-digital conversion of the potential difference into the digital measured value DM takes place without correction of the digital measured value DM.

Next, the potential difference is converted into a digital measured value DM by the electronics unit 2 in such a way that the digital measured value DM is preset to be different from the potential difference, i.e., for example, to have a preset voltage difference. For example, a potential difference of 30 mV is measured and converted into a digital measured value DM of 0 mV. This results in a voltage difference between the potential difference and the digital measured value DM of 30 mV. In another embodiment, the voltage difference between the potential difference and the digital measured value DM is 50 mV. In an alternative embodiment, the voltage difference between the potential difference and the digital measured value DM is 100 mV.

When converting the potential difference into the digital measured value DM, known standard functions stored in the electronics unit 2 can be used to achieve a preset deviation from a corresponding potential difference according to the standard functions. In addition, a temperature value, for example, obtained by a temperature sensor 18 internal to the sensor can be transmitted by the measuring transducer to the pH sensor 1 and can be taken into account when selecting the standard functions.

The converted digital measured value DM preferably corresponds to a digital measured value of the standard functions. If the sensor is designed or configured to output a digital measured value DM in the unit mV, the measured value adapted to the standard function is output.

In one embodiment, a correction function KF is used in the step of converting the potential difference into the digital measured value DM. The correction function KF can be, for example, an exponential function or a polynomial or any function stored in a table.

The correction function KF includes an adjustable correction factor K. The correction factor K can be preset by the manufacturer. The correction factor K makes it possible, for example, to set the desired voltage difference between the potential difference and the digital measured value DM, for example 30 mV, 50 mV, 100 mV.

In an optional embodiment compatible with the above-described embodiments, the correction function KF comprises a temperature factor T, thereby taking into account the temperature of the measurement medium. The temperature factor T is determined based on a temperature value determined by the temperature sensor 18. The temperature sensor is, for example, integrated in the pH sensor and connected to the electronics unit 2. Alternatively, the temperature value of the electronics unit 2 is transmitted by the measuring transducer 110.

The temperature factor T can be applied in one computing step with the A/D conversion and measured value adjustment or in a downstream computing step. In the latter case, both the digital measured value DM and a temperature-corrected measured pH value can be output. In order to achieve temperature compensation for the output measured pH value, an approximation function or an interpolation stored in the sensor can also be used as an alternative to application of the temperature factor T. Alternatively, a table stored in the sensor can also be used. The table enables application of a specific temperature factor depending on the prevailing temperature.

In an optional embodiment compatible with the above-described embodiments, the correction function KF comprises an operating time factor B, thereby taking into account the operating time of the digital pH sensor 1. The operating time factor B is determined based on an operating time of the pH sensor 1. The operating time of the pH sensor 1 is detected by the electronics unit 2. The operating time includes, for example, measurement periods in which the pH sensor was in contact with a measurement medium and storage periods in which the pH sensor was not in contact with any measurement medium.

The evaluation method of a measuring transducer 110 will be described below.

In a first step, the digital measured value DM is transmitted from the digital pH sensor 1 to the measuring transducer 110 via the transmission means 120. The transmission means 120 is, for example, a wireless communication module or a data cable. For example, the transmission means 120 can be a cable with a galvanically isolated plug.

The digital measured value DM is then compared to an upper limit value and a lower limit value. The upper limit value and the lower limit value are values set by the manufacturer, which define a tolerance range within which the expected measured values should be found.

If the digital measured value DM exceeds the upper limit value or falls below the lower limit value, an error message is output. For example, the error message can be output by an audible or visual alarm signal.

In one embodiment of the evaluation method, if the digital measured value DM exceeds the upper limit value or falls below the lower limit value, the energy supply to the digital pH sensor 1 is interrupted. In this variant, the digital pH sensor 1 is supplied with energy by the measuring transducer 110 through the transmission means 120.

Figure 3:
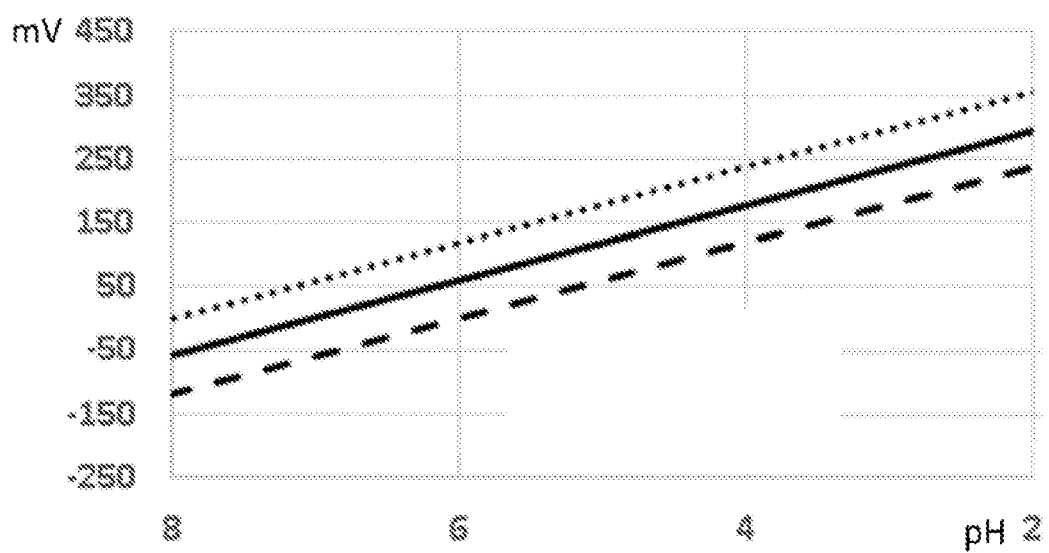
FIG. 3 shows a schematic representation of the pH-dependent measured value measured by the pH sensor according to the present disclosure.

FIG. 3 shows a calibration line for the digital pH sensor 1.

The broken line shows a measurement curve based on actual potential differences between the electrodes which were determined by the digital pH sensor in a calibration medium, for example a measurement medium with a pH value of 7 and a temperature of 25° C.

The solid line shows a measurement curve based on digital measured values DM which were determined by conversion from the potential difference.

The dotted line shows a measurement curve based on digital measured values DM which were obtained by conversion from potential differences, which were fed into the digital pH sensor 1 by a conventional pH sensor as a potential difference.

Figure 4:
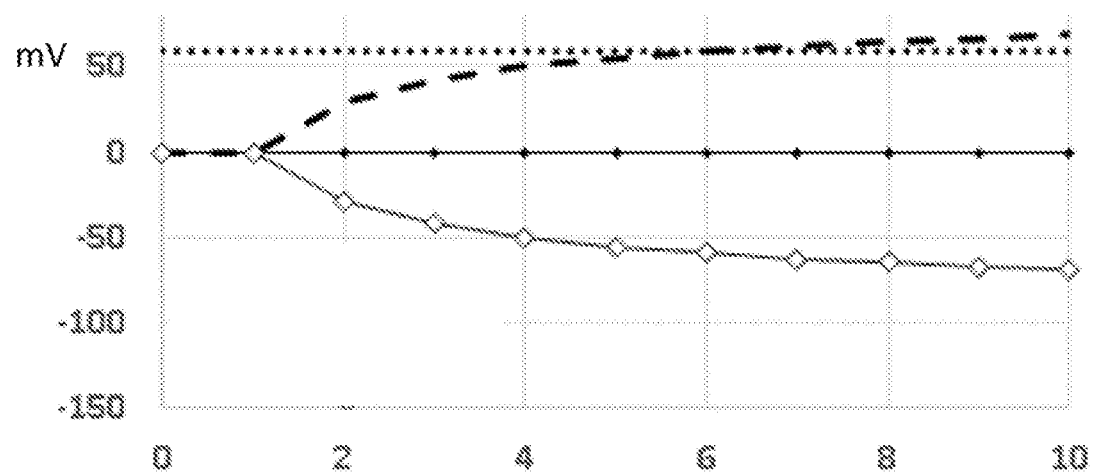
FIG. 4 shows a schematic representation of the time dependence of the measured value measured by the pH sensor according to the present disclosure.

FIG. 4 shows an experimental zero point drift of the digital pH sensor 1.

The solid line with the unfilled points shows the temporal deviation of the zero point output by the sensor. This deviation is called zero point drift.

The broken line shows the change over time of the electrochemical potential of the reference electrode due to electrolyte depletion in the reference half-cell.

The solid line with the filled-in points shows the corrected electrochemical potential of the measuring electrode.

The dotted line shows the uncorrected potential of the measuring electrode which deviates from the standard.

Figure 5:
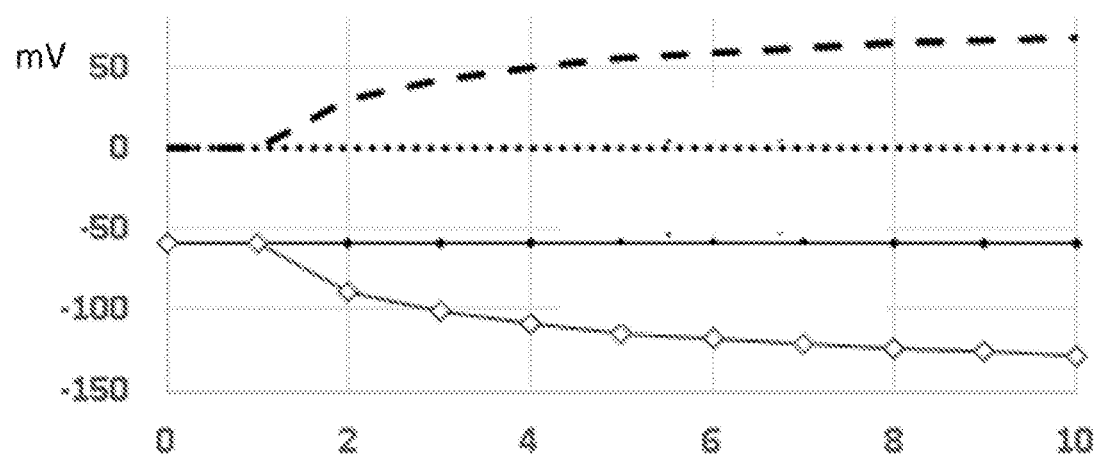
FIG. 5 shows a schematic representation of the time dependence of the measured value measured by the pH sensor according to the present disclosure.
Figure 6:
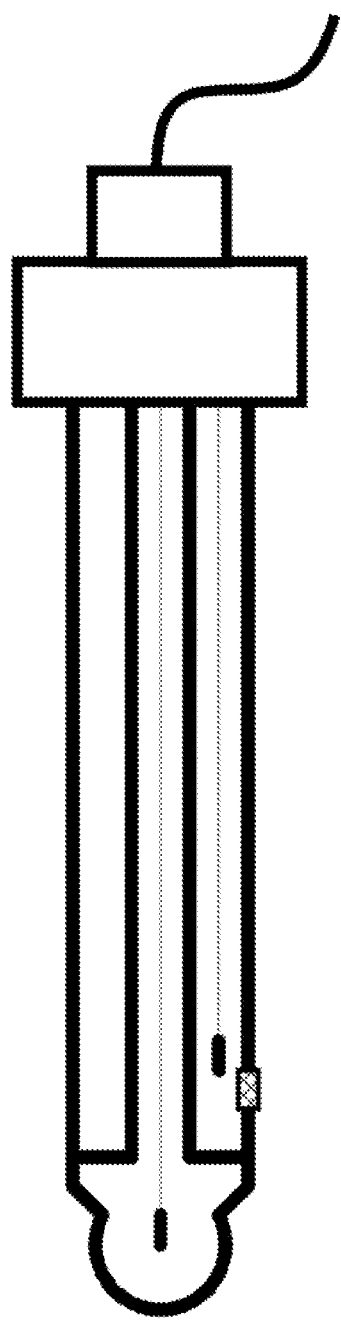
FIG. 6 shows a schematic representation of a pH sensor according to the prior art of an established standard design.

FIG. 5 shows a zero point drift of the digital pH sensor 1 fed with potential differences of another sensor. Thus, given a suitable choice of deviation of the potential, the appearance of a more aged electrode is obtained, which has already drifted away by 59 mV at the beginning of the measurement (at time 0). This behavior then causes the output of an alarm/error message.

The solid line with the unfilled points shows the temporal deviation of the zero point.

The broken line shows the change over time of the electrochemical potential of the reference electrode due to electrolyte depletion in the reference half-cell.

The solid line with the filled-in points shows the erroneously corrected electrochemical potential of the measuring electrode.

The dotted line shows the uncorrected potential of the measuring electrode.

The pH sensor 1 makes it possible to generate a systematic measurement error in the digital measured value DM if the pH sensor 1 is fed with a potential difference of another sensor. Thus, the digital sensor system 100 is able to have a safety risk, as a result of which the sensor system 100 outputs an error message to the user. Alternatively, the error message may also be output by the digital pH sensor 1.

The invention claimed is:

1. A digital pH sensor for measuring a pH in a measurement medium, comprising:
an electronics unit; and
a sensor housing having a first half-cell and a second half-cell,
wherein the first half-cell is a reference half-cell having: an electrolytic junction; a first electrolyte; and a first electrode in contact with the first electrolyte and electrically connected to the electronics unit,
wherein the second half-cell is a measuring half-cell having: a second electrolyte; and a second electrode in contact with the second electrolyte and electrically connected to the electronics unit,
wherein the first half-cell and the second half-cell are adapted to form a potential difference between the first electrode and the second electrode if the digital pH sensor is in contact with the measurement medium,
wherein the electronics unit is programmed with a correction function for converting the potential difference into a digital measured value, wherein the digital measured value is either a voltage value or a pH value,
wherein the first electrolyte and/or a material of the first electrode and/or the second electrolyte and/or a material of the second electrode are selected such that the potential difference between the first electrode and the second electrode, at a pH value of the measurement medium of 7 and a temperature of the measurement medium of 25° C., includes a preset potential difference that is greater than 30 mV or less than −30 mV, and
wherein the electronics unit programmed with the correction function is configured to convert the potential difference into the digital measured value and apply the correction function for correcting out the preset potential difference such that, at a pH value of the measurement medium of 7 and at a temperature of the measurement medium of 25° C. and the potential difference of greater than 30 mV or less than −30 mV, the digital measured value is 0 mV if the digital measured value is output as a voltage value or 7 if the digital measured value is output as a pH value.

2. The digital pH sensor according to claim 1, wherein at 25° C. the second electrolyte has a pH which differs by more than 0.5, from 7.

3. The digital pH sensor according to claim 2, wherein at 25° C. the second electrolyte has a pH of 6 and wherein the first electrolyte includes potassium chloride and the second electrolyte includes potassium chloride and a phosphate buffer.

4. The digital pH sensor according to claim 1, wherein the first electrode and the second electrode each is an Ag/AgCl electrode and chlorine ion activities of the first electrolyte and of the second electrolyte are different such that the potential difference is greater than 30 mV.

5. The digital pH sensor according to claim 1, wherein the material of the first electrode and of the second electrode includes silver or copper or platinum or conductive carbon, and wherein the first electrolyte and the second electrolyte contain halide or sulfate ions, so that the potential difference is greater than 30 mV.

6. A digital sensor system comprising:
a digital pH sensor, comprising:
an electronics unit; and
a sensor housing having a first half-cell and a second half-cell,
wherein the first half-cell is a reference half-cell having: an electrolytic junction; a first electrolyte; and a first electrode in contact with the first electrolyte and electrically connected to the electronics unit,
wherein the second half-cell is a measuring half-cell having: a second electrolyte; and a second electrode in contact with the second electrolyte and electrically connected to the electronics unit,
wherein the first half-cell and the second half-cell are adapted to form a potential difference between the first electrode and the second electrode if the digital pH sensor is in contact with a measurement medium,
wherein the electronics unit is programmed with a correction function for converting the potential difference into a digital measured value, wherein the digital measured value is either a voltage value or a pH value,
wherein the first electrolyte and/or a material of the first electrode and/or the second electrolyte and/or a material of the second electrode are selected such that the potential difference between the first electrode and the second electrode, at a pH value of the measurement medium of 7 and a temperature of the measurement medium of 25° C., includes a preset potential difference that is greater than 30 mV or less than −30 mV, and
wherein the electronics unit programmed with the correction function is configured to convert the potential difference into the digital measured value and apply the correction function for correcting out the preset potential difference such that, at a pH value of the measurement medium of 7 and at a temperature of the measurement medium of 25° C. and the potential difference of greater than 30 mV or less than −30 mV, the digital measured value is 0 mV if the digital measured value is output as a voltage value or 7 if the digital measured value is output as a pH value; and
a measuring transducer for receiving and evaluating the digital measured value, wherein the measuring transducer is adapted to be connected to the digital pH sensor.

7. A measuring method of a digital pH sensor, comprising:
providing the digital pH sensor, comprising:
an electronics unit; and
a sensor housing having a first half-cell and a second half-cell, wherein the first half-cell is a reference half-cell
having: an electrolytic junction; a first electrolyte;
and a first electrode in contact with the first
electrolyte and electrically connected to the electronics unit,
wherein the second half-cell is a measuring half-cell
having: a second electrolyte; and a second electrode in contact with the second electrolyte and
electrically connected to the electronics unit,
wherein the first half-cell and the second half-cell are
adapted to form a potential difference between the
first electrode and the second electrode if the
digital pH sensor is in contact with a measurement
medium,
wherein the electronics unit is programmed with a
correction function for converting the potential
difference into a digital measured value, wherein
the digital measured value is either a voltage value
or a pH value,
wherein the first electrolyte and/or a material of the
first electrode and/or the second electrolyte and/or
a material of the second electrode are selected
such that the potential difference between the first
electrode and the second electrode, at a pH value
of the measurement medium of 7 and a temperature of the measurement medium of 25° C.,
includes a preset potential difference that is greater
than 30 mV or less than −30 mV, and
wherein the electronics unit programmed with the
correction function is configured to convert the
potential difference into the digital measured
value and apply the correction function for correcting out the preset potential difference such
that, at a pH value of the measurement medium of
7 and at a temperature of the measurement
medium of 25° C. and the potential difference of
greater than 30 mV or less than −30 mV, the digital
measured value is 0 mV if the digital measured
value is output as a voltage value or 7 if the digital
measured value is output as a pH value;
measuring the potential difference between the first
electrode and the second electrode using the electronics unit in the measurement medium, wherein the
potential difference at a pH value of the measurement medium of 7 and at a temperature of the
measurement medium of 25° C. includes the preset
potential difference; and
converting the potential difference measured at a pH
value of the measurement medium of 7 and at a
temperature of the measurement medium of 25° C.
into the digital measured value and applying the
correction function for correcting out the preset
potential difference using the electronics unit such
that the digital measured value is 0 mV if the digital
measured value is output as a voltage value or 7 if the
digital measured value is output as a pH value.

8. The measuring method according to claim 7, wherein the correction function includes an adjustable correction factor.

9. The measuring method according to claim 7, wherein the correction function includes a temperature factor, wherein the temperature factor is determined based on a temperature value of the measurement medium, wherein the temperature value of the measurement medium is transmitted by a temperature sensor integrated in the digital pH sensor.

10. The measuring method according to claim 7, wherein the correction function includes an operating time factor, wherein the operating time factor is determined based on an operating time of the digital pH sensor, wherein the electronics unit is adapted for detecting the operating time of the cliental pH sensor.

11. An evaluation method of a measuring transducer, comprising:
providing a digital sensor system, comprising:
a digital pH sensor, comprising:
an electronics unit; and
a sensor housing having a first half-cell and a second half-cell,
wherein the first half-cell is a reference half-cell
having: an electrolytic junction; a first electrolyte; and a first electrode in contact with the first
electrolyte and electrically connected to the
electronics unit,
wherein the second half-cell is a measuring half-cell having: a second electrolyte; and a second
electrode in contact with the second electrolyte
and electrically connected to the electronics
unit,
wherein the first half-cell and the second half-cell
are adapted to form a potential difference
between the first electrode and the second electrode if the digital pH sensor is in contact with
a measurement medium,
wherein the electronics unit is programmed with a
correction function for converting the potential
difference into a digital measured value,
wherein the digital measured value is either a
voltage value or a pH value,
wherein the first electrolyte and/or a material of
the first electrode and/or the second electrolyte
and/or a material of the second electrode are
selected such that the potential difference
between the first electrode and the second electrode, at a pH value of the measurement
medium of 7 and a temperature of the measurement medium of 25° C., includes a preset
potential difference that is greater than 30 mV
or less than −30 mV,
wherein the electronics unit programmed with the
correction function is configured to convert the
potential difference into the digital measured
value and apply the correction function for
correcting out the preset potential difference
such that, at a pH value of the measurement
medium of 7 and at a temperature of the measurement medium of 25° C. and the potential
difference of greater than 30 mV or less than
−30 mV, the digital measured value is 0 mV if
the digital measured value is output as a voltage
value or 7 if the digital measured value is output
as a pH value, and
wherein the measuring transducer is adapted for
receiving and evaluating the digital measured
value, and is adapted to be connected to the
digital pH sensor;
receiving the digital measured value from the digital pH sensor;
comparing the digital measured value to an upper limit
value and a lower limit value; and outputting an error message if the digital measured value exceeds the upper limit value or falls below the lower limit value.

\* \* \* \* \*